(12) United States Patent  
Rosinski et al.

(10) Patent No.: US 12,343,673 B2  
(45) Date of Patent: Jul. 1, 2025

(54) ENERGY EFFICIENT VPSA SYSTEM WITH DIRECT DRIVE HIGH SPEED CENTRIFUGAL COMPRESSORS

(71) Applicant: PRAXAIR TECHNOLOGY, INC., Danbury, CT (US)

(72) Inventors: Andrew C. Rosinski, Orchard Park, NY (US); Nicholas R. Stuckert, Grand Island, NY (US); Yang Luo, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 605 days.

(21) Appl. No.: 17/617,168

(22) PCT Filed: Nov. 5, 2020

(86) PCT No.: PCT/US2020/059095  
§ 371 (c)(1),  
(2) Date: Dec. 7, 2021

(87) PCT Pub. No.: WO2021/096754  
PCT Pub. Date: May 20, 2021

(65) Prior Publication Data  
US 2022/0233993 A1 Jul. 28, 2022

Related U.S. Application Data

(60) Provisional application No. 62/935,937, filed on Nov. 15, 2019.

(51) Int. Cl.  
*B01D 53/02* (2006.01)  
*B01D 53/04* (2006.01)  
(Continued)

(52) U.S. Cl.  
CPC ..... *B01D 53/0446* (2013.01); *B01D 53/0476* (2013.01); *F04D 17/10* (2013.01);  
(Continued)

(58) Field of Classification Search  
CPC .......... B01D 2259/40007; B01D 2259/40009; B01D 2259/402; B01D 53/0446;  
(Continued)

(56) References Cited

U.S. PATENT DOCUMENTS 4,197,096 A 4/1980 Sebastian et al.  
5,258,056 A 11/1993 Shirley et al.  
(Continued)

FOREIGN PATENT DOCUMENTS

CN 105132060 A 12/2015  
KR 10-2001-0052184 A 6/2001  
(Continued)

*Primary Examiner* — Christopher P Jones  
(74) *Attorney, Agent, or Firm* — Andrew G. Melick

(57) ABSTRACT

The present invention relates to a method and system for improving VPSA plant energy and capital efficiency through optimizing direct drive variable speed centrifugal feed, vacuum, and/or product compressors to achieve lower unit gas product production cost. More specifically, the present invention relates to a new energy efficient VPSA process and system which employs high speed direct drive centrifugal compressors to achieve wider production range. Significant lower energy consumption can be achieved over the plant operation life by employing compressors sized with average ambient and production demand, utilizing direct drive variable high speed centrifugal compressors' speed and operating range to meet the desired production demand. Since majority of the plants tend to run at below peak production most of operating life of the plant. In addition, the smaller size machine offers plant capital savings from the initial investment.

18 Claims, 3 Drawing Sheets

(51) Int. Cl.
  *B01D 53/047* (2006.01)
  *F04D 17/10* (2006.01)
  *F04D 25/06* (2006.01)
  *F04D 27/00* (2006.01)

(52) U.S. Cl.
  CPC ........... *F04D 25/06* (2013.01); *F04D 27/004* (2013.01); *B01D 2259/40007* (2013.01); *B01D 2259/402* (2013.01)

(58) Field of Classification Search
  CPC ... B01D 53/047; B01D 53/0476; F04D 17/10; F04D 25/06; F04D 27/004
  See application file for complete search history.

(56) References Cited

U.S. PATENT DOCUMENTS

| | | |
|---|---|---|
| 5,702,504 A | 12/1997 | Schaub et al. |
| 6,030,435 A | 2/2000 | Monereau et al. |
| 6,068,678 A | 5/2000 | Labasque et al. |
| 6,146,450 A | 11/2000 | Duhayer et al. |
| 6,506,234 B1 | 1/2003 | Ackley et al. |
| 7,641,716 B2 | 1/2010 | Lomax, Jr. et al. |
| 7,785,405 B2 | 8/2010 | Manning et al. |
| 8,529,665 B2 | 9/2013 | Manning et al. |
| 9,089,810 B2 | 7/2015 | Belanger et al. |
| 10,105,637 B2 | 10/2018 | Hirashi et al. |
| 10,792,610 B2 | 10/2020 | Stuckert et al. |
| 10,799,827 B2 | 10/2020 | Stuckert et al. |
| 2006/0230924 A1* | 10/2006 | Deane .................. B01D 53/053 95/96 |
| 2007/0039467 A1 | 2/2007 | Monereau et al. |
| 2009/0241771 A1 | 10/2009 | Manning |
| 2011/0277629 A1 | 11/2011 | Manning |
| 2012/0325085 A1 | 12/2012 | Belanger et al. |
| 2013/0283854 A1 | 10/2013 | Wang |
| 2014/0041521 A1 | 2/2014 | Belanger et al. |
| 2014/0053732 A1 | 2/2014 | Manning et al. |
| 2016/0184764 A1 | 6/2016 | Baker |
| 2019/0010949 A1 | 1/2019 | Swindlehurst et al. |
| 2020/0179638 A1* | 6/2020 | Oddo .................. B01D 53/047 |
| 2020/0410374 A1* | 12/2020 | White .................. G16H 40/67 |

FOREIGN PATENT DOCUMENTS

| | | |
|---|---|---|
| KR | 10-2014-0034243 A | 3/2014 |
| KR | 10-2018-0061246 A | 6/2018 |

* cited by examiner

ENERGY EFFICIENT VPSA SYSTEM WITH DIRECT DRIVE HIGH SPEED CENTRIFUGAL COMPRESSORS

RELATED APPLICATIONS

This application claims the benefit of International Application No. PCT/US2020/059095, filed on Nov. 5, 2020, which claimed the benefit of U.S. Provisional Application No. 62/935,937, filed on Nov. 15, 2019, which are incorporated herein by reference.

FIELD OF THE INVENTION

The present invention generally relates to energy efficient gas separation processes and systems that utilizes direct drive variable high speed centrifugal compressors to pressurize and/or evacuate adsorbent vessels and further pressurize product gas within an adsorption type gas separation system.

BACKGROUND OF THE INVENTION

Separations of a gas from admixture with other gases are important industrial processes. In such processes the objective may be either to obtain a product gas enhanced in a gas or from which that particular product gas has an undesired constituent removed therefrom. For example, there are commercial scale processes to separate air into its component gases to obtain nitrogen, oxygen, and argon and for air pre-purification processes to pretreat the air prior to use in other processes such as the cryogenic separation of air into its component gases.

Air separation can be accomplished using adsorption processes, in particular, pressure swing adsorption (PSA) and vacuum pressure swing adsorption (VPSA) type processes. In PSA and VPSA processes, compressed air is pumped through a fixed bed of an adsorbent exhibiting an adsorptive preference for one of the main constituents whereby an effluent product stream enhanced in the non-adsorbed (or lesser adsorbed) constituent is obtained. Compared to more traditional cryogenic air separation processes, adsorption processes for air separation require relatively simple equipment and are relatively easy to maintain. Adsorption processes, however, typically have lower product recovery than many cryogenic processes. For this reason, improvements in the efficiency of adsorption processes remain an important goal. One principal means of improvement is the discovery and development of better adsorbents. Some such adsorbents have led to reduced cycle times within a given adsorption process. According, new equipment capable of meeting the demands of reduced cycle times are required.

There also continues to be a demand for PSA and VPSA plants with lower power consumption. The basic process employs a selective adsorbent to remove at least one component of a gas mixture, employing four basic process steps: (1) adsorption, (2) depressurization, (3) purge and, (4) repressurization. The gas mixture containing the more readily adsorbable component and a less readily adsorbable component is passed through at least one adsorbent bed capable of selectively adsorbing the more readily adsorbable component at a predetermined (upper) adsorption pressure. The gas stream exiting the bed at this upper pressure is now concentrated in the less readily adsorbable component and is removed for example as product. When the bed becomes saturated with the readily adsorbable component, the bed is thereafter depressurized to a lower desorption pressure for the desorption of the readily adsorbable component, with this gas then discharged from the system. Some processes can include additional steps such as equalization and product pressurization.

Conventional PSA and VPSA processes employ rotary-type positive displacement blowers for either gas pressurization or evacuation in an adsorbent bed. These conventional rotary-lobe blowers typically have lower efficiencies and higher maintenance costs than centrifugal compressors, but they do adapt quite well to the oscillating nature of the pressure swing cycles. An attractive feature of rotary-lobe blowers pertaining to an adsorption process is that power consumption is proportional to system pressure requirements. The theoretical power consumption of the blower is directly proportional to the system pressure differential (i.e., has a linear relationship between power consumption and pressure). This linear power response to the system pressure requirements has made rotary-lobe blowers the compression equipment of choice for the PSA and VPSA industry. Rotary-lobe blowers, however, create strong pressure pulsations in the system. Without proper mitigation, pressure pulsations from rotary-lobe blowers are known to cause severe structural damage in downstream process equipment. Although pulsation damper vessels are normally used with rotary-lobe blowers, they do not eliminate the mismatch completely, and a considerable pressure pulsation level is always present in the system.

In the past, centrifugal compressors at fixed speeds with and without inlet guide vanes (IGVs) and with a variable-frequency drive (VFD) have been considered for PSA and VPSA processes because of their higher efficiency when compared to conventional rotary-lobe blowers. Centrifugal compressors typically need to be able to run at high speeds and follow highly dynamic pressure swing cycles while maintaining optimum efficiency to leverage high adiabatic machine efficiency. It is necessary to employ variable-speed control and/or IGV, or a combination of the two to meet variable feed flow conditions. As the PSA or VPSA cycle pressure deviates from the design pressure condition of a fixed-speed centrifugal compressor, the stage efficiency deteriorates substantially, especially when operating at pressure ratios close to 1 (choking). This results in increased average power consumption and a deterioration of the overall average compressor efficiency over the PSA or VPSA cycle.

Still, this technology could not be successfully employed in the past. The use of conventional fixed-speed centrifugal compressors with and without IGVs is not ideal because of their inability to follow fast speed ramp up and down required by cyclic pressure swing adsorption process. A conventional variable-speed centrifugal compressor can have an improved operating range and improved energy savings over the use of IGVs with a reduction in flow but is unable to rapidly adapt to the transient flow conditions of the PSA or VPSA cycle (due to the large inertias of the gears and large slow running conventional induction motor).

Several advances to PSA and VPSA processes have taken place in recent years. Some of these advances include: (a) a significant reduction in the ratio of the top adsorption to bottom desorption pressures, and (b) reductions in the cycle time (typically less than one minute) leading to reduced adsorbent inventories. A significant factor to the total energy requirement of a PSA or VPSA process is this ratio of adsorption to desorption pressures. The delivery pressure during the adsorption period of a bed by the feed air compression device, as well as the suction pressure during the desorption period by an evacuation device, is constantly changing as the cycle progresses. In order to achieve the lowest possible total power consumption for a cycle such as this, it is desirable for the feed compression and evacuation devices to be operated at peak efficiency over a wide range of pressure ratios.

VPSA plants are typically designed and sized to meet maximum production requirement at highest ambient temperature conditions. However, VPSA plants often run at lower than design capacity due to changes in customer demand and ambient conditions. Typical VPSA turn down operation is achieved through extending cycle step time without changing the feed flow and adsorption and desorption pressure range. In addition, a product recirculation stream is used to ensure machine operation. Therefore, VPSA operation in turn down mode is not as energy efficient as at the design point. The goal of present invention is to improve VPSA plant energy and capital efficiency through optimizing direct drive variable speed centrifugal feed, vacuum, and product compressors to minimize initial plant capital investment and achieve low unit production costs and lower overall energy efficiency over the life of the plant.

SUMMARY OF THE INVENTION

The present invention relates to a method and system for improving VPSA plant energy and capital efficiency through optimizing direct drive variable speed centrifugal feed, vacuum, and/or product compressors to achieve lower unit gas product production cost. More specifically, the present invention relates to a new energy efficient VPSA process and system which employs high speed direct drive centrifugal compressors to achieve wider production range. Significant lower energy consumption can be achieved over the plant operation life by employing compressors sized with average ambient and production demand, utilizing direct drive variable high speed centrifugal compressors' speed and operating range to meet the desired production demand. Since majority of the plants tend to run at below peak production most of operating life of the plant. In addition, the smaller size machine offers plant capital savings from the initial investment.

DETAILED DESCRIPTION OF THE FIGURES

DETAILED DESCRIPTION OF THE INVENTION

Figure 1:
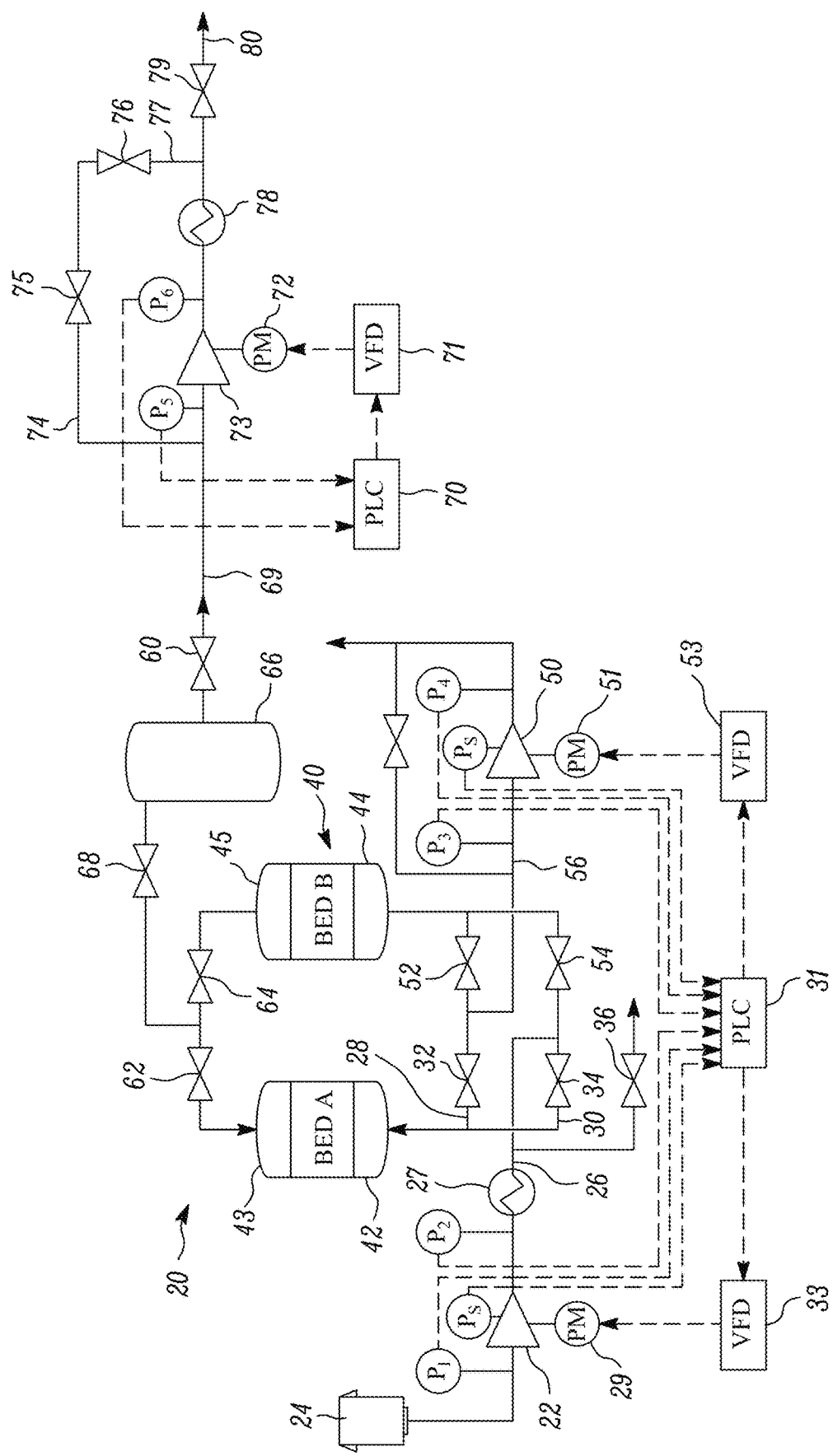
FIG. 1 illustrates a typical VPSA plant with 3 pieces of rotating equipment.

Centrifugal technology is based on dynamic compression. In a dynamic compressor, gas, such as air, oxygen, nitrogen, and or other gases, is drawn between the blades of a rapidly rotating impeller and accelerates to high velocity. The air is then discharged through a diffuser where the kinetic energy is transformed into static pressure. Most dynamic compressors are turbo compressors with an axial or radial flow pattern and are designed for larger volume flow rates. The performance of a dynamic compressor is very much dependent on environmental conditions such as:

1) Inlet temperature
2) Inlet pressure
3) Relative humidity (RH)
4) Cooling water temperature Decreasing the inlet temperature of the air increases air density resulting in higher free air delivery (Actual Cubic per Minute, ACFM), higher power consumption of the compressor and higher available turndown range. Likewise, increasing inlet temperature of the air decreases air density resulting in lower free air delivery (ACFM), lower power consumption of the compressor and smaller available turndown range.

A decrease in inlet pressure will reduce the density of the air at the compressor intake. As with higher temperatures, it will result in lower free air delivery, lower power consumption and smaller available turndown. And increase in inlet pressure will increase the density of the air at the compressor intake, resulting in result in higher free air delivery, higher power consumption and higher available turndown.

The addition of water vapor to the air makes air humid and reduces the density of the air. This is due to the molar mass of water being less than that of air. Accordingly, an increase in relative humidity reduces flow and power, and a decrease in RH will increase flow and power.

Finally, the cooling water temperatures affect the intake such that colder water increases flow and power, and warmer water reduces flow and power.

VPSA plants are typically designed and sized to meet maximum production requirement at highest ambient temperature conditions. However, VPSA plants often run at lower than design capacity due to changes in customer demand and ambient conditions, reducing the efficiency of the turn down operation. Contrary to the conventional design philosophy of sizing plant to meet maximum capacity requirement at the highest ambient condition, the present invention lowers the plant capital by designing VPSA plant for average production requirements and ambient conditions, speeding up machines to meet maximum capacity requirement when needed. Variable speed compressors are ideal for achieving desired flow and pressure requirements to produce average production requirements while maintaining optimum compressor efficiency. When production requirements exceed the average production requirements compressor speeds are increased to increase flowrates to meet production demands. Average production requirements of the system typically range from about 50 to about 90% of the maximum design capacity requirements for the system at the highest ambient temperature. In another embodiment average production requirements of the system typically range from about 60 to about 90%, in another embodiment from about 70 to about 90%, and in yet another embodiment from about 80 to about 90% of the maximum design capacity requirements for the system at the highest ambient temperature.

The present invention more particularly relates to gas separation processes and systems such as PSA or VPSA adsorption systems having at least one vessel containing at least one adsorbent bed therein. The adsorbent bed includes at least one adsorbent material. In some embodiments, at least one adsorbent bed is cyclically pressurized by at least one feed compressor and sometimes evacuated by at least one vacuum compressor, with the at least one feed compressor or the at least one vacuum compressor being a centrifugal compressor driven by an associated high-speed induction motor designed for variable high-speed operation. In such embodiments, the compressor that is not a centrifugal compressor can be a rotary-lobe blower driven by the induction motor. In some embodiments of the present invention, the adsorbent bed is cyclically pressurized by at least one feed centrifugal compressor driven by an associated high-speed induction variable-speed motor and, evacuated by at least one vacuum centrifugal compressor driven by an associated high-speed induction variable-speed motor. More specifically and in accordance with the present invention, the centrifugal feed compressor(s) and/or centrifugal vacuum compressor(s) are driven by direct drive high-speed induction motors for variable-speed operation such that the compressor and high-speed induction motor combination(s) can accelerate from low-speed to high-speed and decelerate from high-speed to low-speed in rapid rates required by shorter cycle times of current PSA or VPSA systems and processes.

Use of variable-speed controlled high-speed permanent magnet or induction motors allows for an order of magnitude improvement over conventional low-speed induction motor/gearbox systems in their ability to accelerate and slow down the centrifugal compressor in a PSA or VPSA process. Using high-speed motors allows for the elimination of the necessity for gearboxes and thus likewise allows for the elimination of the necessity of lube oil systems. The centrifugal compressor(s) can thus be supported on oil free bearings. Furthermore, in some embodiments, the proposed drive systems of the present invention are expected to be more efficient by over 7 percentage points with the elimination of gear and bearing oil friction losses, lube oil system losses, and an improved ability to lead/lag power.

To achieve the high efficiency of centrifugal compressors, it is essential that the compressors are operated along a peak efficiency line. The peak efficiency line is a line drawn on a compressor performance map. As discussed herein, a compressor performance map, i.e., the pressure ratio vs. mass flow at various speeds, is generated from the isentropic work coefficient at various speeds for a specific inlet temperature to the compressor. The peak efficiency line represents the loci of points that correspond to all the peak efficiency points of the compressor operating curves at different speeds. By operating along the peak efficiency line, the compressor(s) can be operated at its most efficient mode in terms of power consumption.

The performance map(s) can also be in the form of lookup or reference tables generated from the isentropic work coefficient. The performance maps and resulting best efficiency lines can be stored in a programmable logic controller (PLC) and integrated with the PSA and VPSA systems.

With the design methodology of the invention, one or more centrifugal compressors are sized for average product demand, wherein the speed can be increased in order to meet higher capacity requirements. It is important to design compressor impeller with a characteristic of flat efficiency curves to minimize efficiency reduction when the machine is operated outside of design conditions.

As previously mentioned, VPSA plants are conventionally designed to meet maximum production requirements even though customers often require less amount of oxygen production most of the time. Ambient conditions, temperature and elevation can have a meaningful impact on VPSA plant production. With direct drive variable speed centrifugal compressors, one can take advantage of compressor speed to design VPSA plant for average production requirement and ambient condition, speed up machine to meet maximum capacity requirement when needed. This design approach offers capital and power savings compared to conventional design philosophy of always designing plant to meet maximum capacity requirement.

While not to be construed as limiting, the present invention is implemented in PSA or VPSA adsorption processes that separate gases, such as air into oxygen and nitrogen. Other gas separations processes that can benefit from the use of the present invention include, but are not limited to, PSA and VPSA separations involving the recovery of gases such as $O_2$, $N_2$, $CO_2$, $H_2$, Ar, or He.

Using V30C compressor as example, one can turn up the flow by ~50% at constant pressure ratio while still maintaining high efficiency. If additional flow is desired, machine can be further pushed towards choke at expense of efficiency. Of course, one will need to size the motor to have enough power to cover the increased flow.

As illustrated in FIG. 1, a VPSA plant typically has 3 pieces of rotating equipment. A feed machine (22) provides air to the plant. The air is separated to produce oxygen. A vacuum machine (50) removes waste nitrogen from the plant. A product compressor (73) boosts the oxygen pressure from the plant to the customers desired supply pressure. Typically, the feed and vacuum machines are roots style rotary blowers. These machines operate at fixed speed and flow capacity cannot be changed once installed. Therefore, once a VPSA is designed and built the amount of oxygen produced cannot be increased. Typically, for single stage compression the product compressor is either a reciprocating compressor or fixed speed centrifugal compressor. Like the traditional feed and vacuum machines, the traditional product compressors, once selected and installed, cannot be adjusted to increase oxygen capacity. If less oxygen product is needed, compressor will be operated in recirculation mode through recirculation line (77) along with recirculation control valves (75,76), and machine will consume the same amount of power as if it is producing 100% of the capacity. In other words, capacity turn down will not yield any power savings from the product compressor.

Using centrifugal compressors with high speed motors and VFD, a VPSA plant can be designed and rotating equipment can be selected to produce a certain amount of oxygen and can also produce more oxygen by increasing compressor speed when needed due to customer demand or changing ambient conditions. The higher capacity is accomplished by increasing the speed of the compressor by adjusting motor speed via the VFD. The three machines will need to be adjusted together, i.e. if you increase the feed machine speed to add more air to the plant, you will need more vacuum capacity to remove the additional waste nitrogen and more product compressor capacity to handle the additional oxygen produced by the plant.

U.S. Pat. Nos. 7,785,405 and 8,529,665 teach operating a centrifugal compressor with high speed motor and VFD by adjusting the feed and vacuum machine speed to maintain operation on the peak efficiency line as the VPSA pressure changes over the cycle. It is important to operate along this peak efficiency line in order to capture the full power advantage of these machines. However, if additional oxygen is required due to customer demand or changes in ambient conditions, the operating line can be shifted toward choke by increasing the speed of the compressor. The increase in speed is accomplished by applying a multiplier to the calculated speed.

For the centrifugal product compressor with high speed motor and VFD, unlike the feed and vacuum machines, the compressor will operate at the design point of the compressor (pressure, flow, and speed). Similar to the feed and vacuum machines, one can increase the flow from this machine by increasing the speed while maintaining the same outlet pressure.

Figure 2:
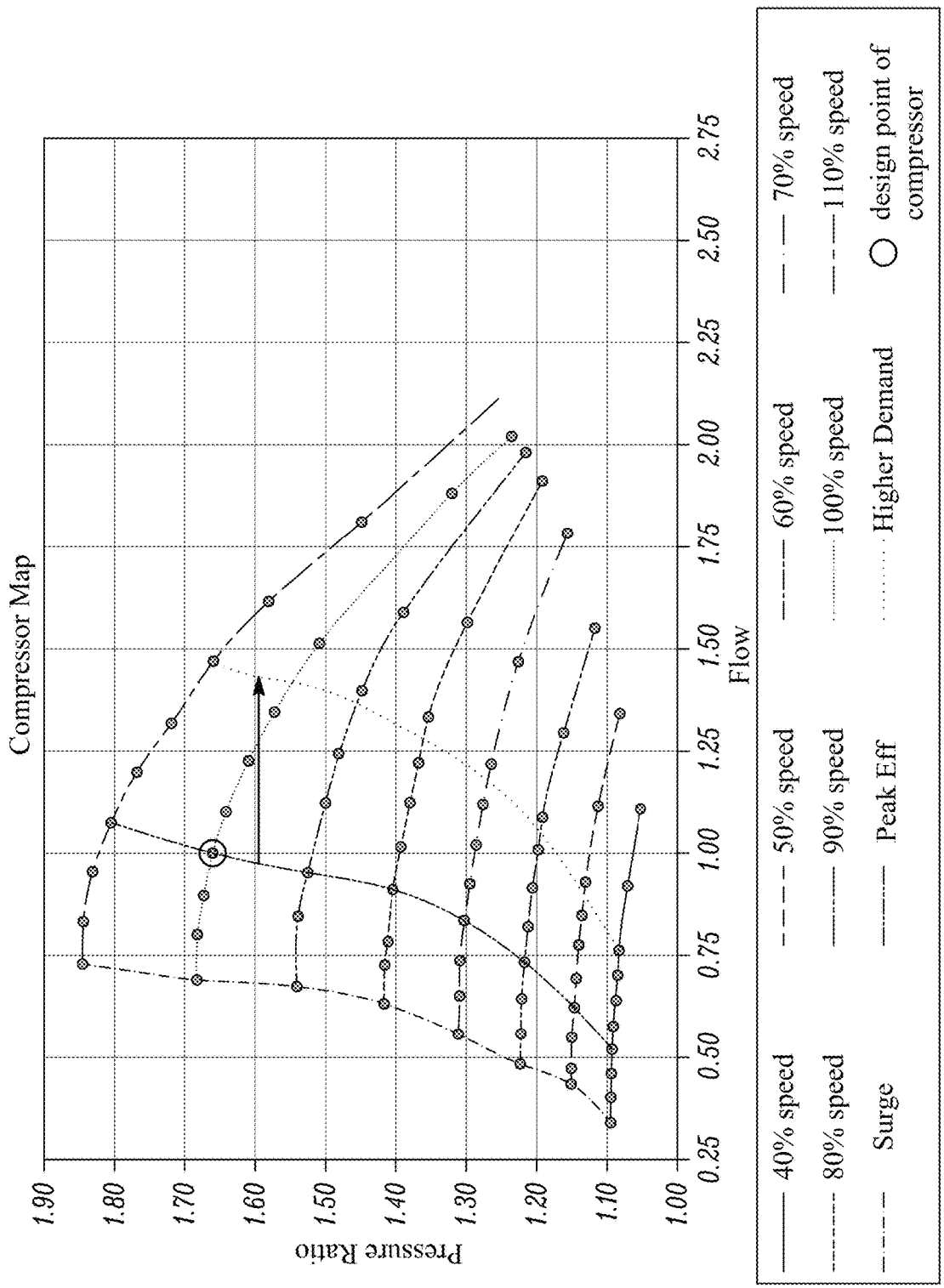
FIG. 2 shows the compressor performance map for the example V30C compressor driven by a high-speed motor and VFD.

FIG. 2 shows the compressor performance map for the example V30C compressor driven by a high-speed motor and VFD. The map was generated following PTC-10 test protocol. The machine is operated at a constant speed. A suction throttle valve is used to vary the flow and pressure as the machine moves from choke to surge at said constant speed. Data points are collected using temperature, pressure and flow measurements to form a curve of flow versus pressure ratio. Temperature measurements are used to determine the efficiency of the machine at each of the points along the curve and to determine the peak efficiency point for said speed. This test was repeated for various speeds from 40% to 110% of design speed of the compressor to form the complete performance map.

The design point for the compressor is shown on the map. The design point includes flow, pressure ratio, and speed that the compressor impeller is designed to operate at to meet the process requirements. For typical compressors with fixed speed motor and gear box, the compressor operates at or near this design point. For compressors driven by high-speed motors and VFD, the compressor can operate over the entire map including along the peak efficiency line at different speeds. The compressor can also be operated at higher flow at the same head by increasing the speed of the motor. This provides the flexibility to design a compressor for a certain flow and pressure but operate at higher flows if process requirements change.

From FIG. 2, line 1 shows the peak efficiency points at all speeds. This includes the design point for the compressor and the line along which it is desired to operate the machine to maintain highest efficiency. Line 2 in FIG. 2 shows a higher flow operating line that the machine could run at to provide more flow to the process.

Traditionally if customer demand or ambient conditions dictate a higher flow case, the plant and associated compression equipment would be designed to produce the higher flow. Process turndown would be used for normal operating case or normal ambient conditions.

However, with direct drive centrifugal the compressor and high-speed motor with VFD, the plant could be designed for the normal (line 1) flow case and then turned up for the higher flow case (line 2). Operating in this mode would use a smaller compressor and be lower in capital. It would also operate at lower power for the average demand since a compressor designed for average flow has higher efficiency when operated at design point than larger compressor operating in turndown mode.

Figure 3:
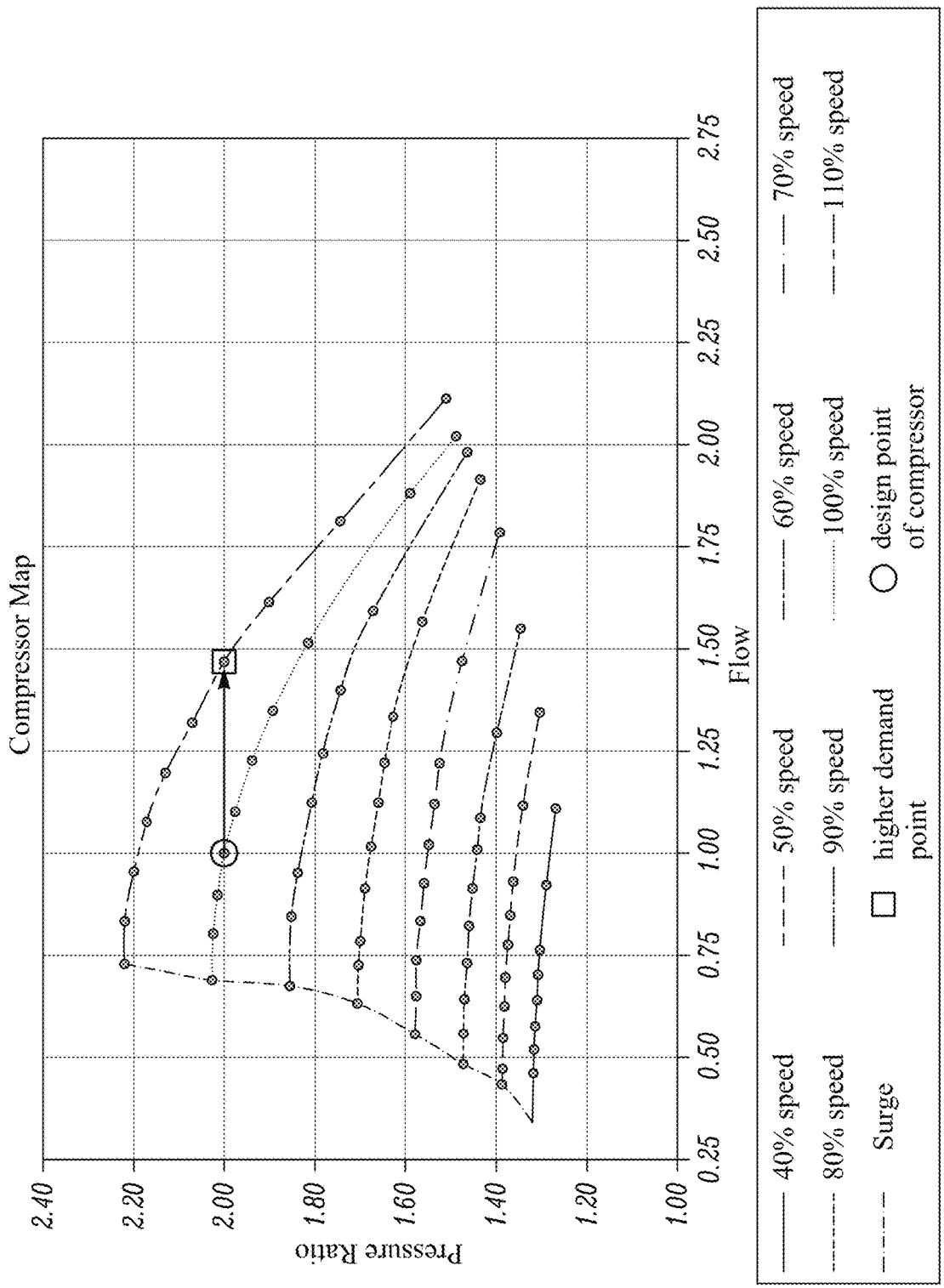
FIG. 3 shows a compressor map for an oxygen product compressor.

FIG. 3 shows a compressor map for an oxygen product compressor. The design point for the compressor is shown on the map. The design point includes a flow, pressure ratio, and speed that the wheel is designed to operate at to meet the process requirements. For typical compressors using fixed speed motor and gear box, the compressor operates at or near this design point. For compressors drive by high-speed motors and VFD as described in the patent, the compressor can operate over the entire map. The compressor can also be operated at higher flow at the same head by increasing the speed of the motor. This provides the flexibility to design a compressor for a certain flow and pressure but operate at a higher flow if production requirements change.

For a traditional product compressor, the compressor would be designed to meet highest customer demand or worst-case ambient conditions. When demand is lower, the compressor flow to customer would be reduced by recirculating discharge gas back into the inlet of the compressor. This uses the full power of the compressor as if it is at the higher flow rate. Therefore, product compressor will always be operated at peak power even if product demand is reduced. For a centrifugal compressor with high-speed motor and VFD, the compressor can be sized for average flow or average ambient conditions and then for higher demand or the worst-case ambient condition, the peak production amount can be achieved by increasing the compressor speed through increasing motor speed via VFD. This concept is shown in FIG. 3, where the compressor design point is shown. At this speed, the compressor will produce flow for normal conditions. Then for higher demand the speed of the compressor is increased which shifts the operating point of the compressor toward the right where it produces more flow at the same pressure. This saves both capital and power as a smaller compressor can be used to meet the higher demand and a compressor operating at the average design point used less power than a larger compressor operating in recirculation mode.

Assuming average production demand is 75% of peak demand, compressor capital and power impacts for an oxygen VPSA plant are illustrated in Tables 1 and 2.

TABLE 1

Capital impact of the conventional compressor sizing per peak demand vs the proposed average demand sizing Plant Capacity

| Oxygen | Peak Demand 150 | | | Average Demand 112.5 | | |
|---|---|---|---|---|---|---|
| (ton/day) | Feed | Vacuum | Product | Feed | Vacuum | Product |
| Compressor, KW | 800 | 1000 | 375 | 640 | 800 | 280 |
| Capital Impact | 100% | 100% | 100% | 80% | 80% | 80% |

TABLE 2

Power comparison of the conventional compressor sized per peak demand vs the proposed average demand, with roots and centrifugal VPSA

| Power Impact | Conventional VPSA Roots + Reciprocating | | | Centrifugal VPSA Compressors: sized per avg (75% Peak) demand | | |
|---|---|---|---|---|---|---|
| | Feed | Vacuum | Product | Feed | Vacuum | Product |
| Peak Demand (150 ton/day Oxygen, 100%) | 100% | 100% | 100% | 101% | 101% | 101% |
| Average Demand (112.5 ton/day Oxygen, 75% Peak) | 85% | 85% | 100% | 75% | 75% | 75% |

From Tables 1 and 2, one can clearly see a VPSA plant with compressors sized per average production demand presents capital advantage. For peak demand production, machine sized per average condition will consume slightly higher power due to that machine will be operated slightly below peak efficiency. However, in real plant operation window, the impact of the power increase will be minimum. The plant designed per average demand will have high potential achieving power savings in the life of plant operation due the fact that majority of plants are operated at below peak demand at most of time.

A less energy efficient alternative than employing the proposed direct drive high-speed centrifugal compressors is to size the compressors per peak customer production demand. These machines will be operated at less efficient turn down mode when customer production demand is lower than the peak level.

One intermediate option will be only employing direct drive high-speed permeant magnetic or high-speed induction centrifugal compressor as product compressor while using conventional positive displacement roots blower for pressurize and depressurize the adsorption vessels. The centrifugal product compressor can be sized per average demand, while the roots blowers will need to be sized to meet peak customer production demand.

We claim:

1. An adsorption system for gas separation having a maximum design gas separation production at a maximum design ambient temperature condition, the adsorption system comprising:
   a. at least one vessel containing at least one adsorption bed including at least one adsorption material;
   b. at least one compressor configured to be driven by an associated motor comprising a direct drive high-speed permanent magnet or high-speed induction motor designed for variable-speed operation; and
   c. means for receiving data signals for conditions in the system and for communicating to the direct drive high-speed permanent magnet or high-speed induction motor driving the at least one compressor in response to the conditions such that the at least one compressor can operate at a designated speed;
   d. wherein the at least one bed is configured for cyclical pressurization and depressurization during operation,
   e. wherein said at least one compressor is sized for peak efficiency for a reduced gas separation production requirement at ambient conditions for said system, wherein said reduced production requirement ranges from about 50-90% of the maximum design gas separation production of the system at the maximum design ambient temperature condition;
   f. wherein the system is configured to increase the speed of said at least one compressor when a gas separation product production requirement exceeds the reduced gas separation production requirement of the system.

2. The system of claim 1 comprising a product compressor to achieve a desired product pressure at average and peak production capacity wherein said product compressor is a positive displacement or a dynamic compressor.

3. The system of claim 2 wherein said product compressor is a reciprocating compressor, screw compressor, roots compressor or centrifugal compressor.

4. The system of claim 3 wherein said product compressor is a centrifugal compressor, and the speed and pressure ratio of said product compressor can be increased to achieve the desired product pressure and flow.

5. The system of claim 1, wherein the system is a PSA or a VPSA system.

6. The system of claim 5, wherein the PSA or VPSA system is configured to recover at least one gas selected from the group comprising: $O_2$, $N_2$, $CO_2$, $H_2$, Ar, or helium.

7. The system of claim 4, wherein said system is a two-bed VPSA system, wherein said at least one compressor is a feed centrifugal compressor and/or a vacuum centrifugal compressor.

8. The system of claim 4, wherein said system is a two-bed VPSA system, wherein said at least one compressor is a vacuum compressor.

9. The system of claim 1, wherein the associated motor of the at least one compressor is in communication with at least one associated variable-frequency drive and the at least one associated variable-frequency drive is in communication with the means for receiving data signals.

10. The system of claim 7, wherein the associated motor of the at least one feed centrifugal compressor is in communication with at least one associated variable-frequency drive and the at least one associated variable-frequency drive is in communication with the means for receiving data signals and/or wherein the associated motor of the at least one vacuum centrifugal compressor is in communication with at least one associated variable-frequency drive and the at least one associated variable-frequency drive is in communication with the means for receiving data signals.

11. The system of claim 1, wherein the conditions in the system comprise inlet pressure and outlet pressure for the at least one compressor and inlet temperature for the at least one compressor.

12. The system of claim 9, wherein the means for receiving data signals is configured to determine a pressure ratio (outlet pressure/inlet pressure) for the at least one compressor.

13. The system of claim 9, wherein the means for receiving data signals communicates during operation to the associated high-speed permanent magnetic motor and or high-speed induction motor of the at least one compressor a speed at which to operate in response to a pressure ratio and an inlet temperature for the at least one compressor.

14. The system of claim 9, wherein the associated high-speed induction and or permanent magnetic motor is directly coupled to the at least one compressor such that the at least one compressor can be operated at or near a predetermined efficiency line.

15. The system of claim 14, wherein the predetermined efficiency line is a best efficiency line represented by a loci of points that correspond to peak efficiency points of compressor operating curves at different speeds and process conditions of the at least one centrifugal compressor.

16. The system of claim 10, wherein the means for receiving data signals is configured to determine a pressure ratio (outlet pressure/inlet pressure) for the at least one feed centrifugal compressor and/or vacuum centrifugal compressor.

17. The system of claim 10, wherein the means for receiving data signals communicates during operation to the associated high-speed permanent magnetic motor and or high-speed induction motor of the at least one feed centrifugal compressor and/or vacuum centrifugal compressor a speed at which to operate in response to a pressure ratio and an inlet temperature for the at least one feed centrifugal compressor and/or vacuum centrifugal compressor.

18. The system of claim 10, wherein the associated high-speed induction and or permanent magnetic motor is directly coupled to the at least one feed centrifugal compressor and/or vacuum centrifugal compressor such that the at least one feed centrifugal compressor and/or vacuum centrifugal compressor can be operated at or near a predetermined efficiency line.

* * * * *